(12) United States Patent
Allauzen et al.

(10) Patent No.: US 8,924,212 B1
(45) Date of Patent: Dec. 30, 2014

(54) SYSTEM AND METHOD FOR ROBUST ACCESS AND ENTRY TO LARGE STRUCTURED DATA USING VOICE FORM-FILLING

(75) Inventors: Cyril Georges Luc Allauzen, New York, NY (US); Sarangarajan Parthasarathy, New Providence, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1711 days.

(21) Appl. No.: 11/213,458

(22) Filed: Aug. 26, 2005

(51) Int. Cl.
*G10L 15/06* (2013.01)
*G10L 15/00* (2013.01)

(52) U.S. Cl.
USPC .......................................... 704/251; 704/236

(58) Field of Classification Search
CPC ......... G06F 3/16–3/167; G06F 17/20–17/289; G10L 15/00–15/34; G10L 17/00–17/26
USPC ............................... 704/9–10, 231, 236–257, 704/E17.001–E17.008, E17.013–E17.014, 704/E15.014–E15.024, E15.038
See application file for complete search history.

(56) References Cited

U.S. PATENT DOCUMENTS

| | | | | |
|---|---|---|---|---|
| 4,829,580 A * | 5/1989 | Church | .......................... | 704/260 |
| 4,852,180 A * | 7/1989 | Levinson | .................... | 704/256.4 |
| 5,241,619 A * | 8/1993 | Schwartz et al. | ............. | 704/200 |
| 5,502,790 A * | 3/1996 | Yi | ................................. | 704/256 |
| 5,732,187 A * | 3/1998 | Scruggs et al. | ............... | 704/251 |
| 5,839,105 A * | 11/1998 | Ostendorf et al. | ............ | 704/256 |
| 5,913,192 A * | 6/1999 | Parthasarathy et al. | ..... | 704/256.1 |
| 6,108,627 A * | 8/2000 | Sabourin | ........................ | 704/243 |
| 6,272,456 B1 * | 8/2001 | de Campos | ........................ | 704/8 |
| 6,308,156 B1 * | 10/2001 | Barry et al. | .................... | 704/268 |
| 6,456,969 B1 * | 9/2002 | Beyerlein | ....................... | 704/234 |
| 6,470,315 B1 * | 10/2002 | Netsch et al. | .............. | 704/256.5 |
| 6,668,243 B1 * | 12/2003 | Odell | ............................. | 704/243 |
| 6,738,745 B1 * | 5/2004 | Navratil et al. | ............... | 704/277 |
| 7,379,870 B1 * | 5/2008 | Belvin et al. | ................... | 704/255 |
| 7,567,896 B2 * | 7/2009 | Coorman et al. | ............... | 704/10 |
| 7,725,319 B2 * | 5/2010 | Aronowitz | ..................... | 704/253 |
| 2001/0020226 A1 * | 9/2001 | Minamino et al. | ........... | 704/251 |
| 2002/0032591 A1 * | 3/2002 | Mahaffy et al. | ................... | 705/8 |
| 2002/0052870 A1 * | 5/2002 | Charlesworth et al. | .......... | 707/3 |
| 2003/0033146 A1 * | 2/2003 | Morin et al. | ................... | 704/251 |
| 2003/0191625 A1 * | 10/2003 | Gorin et al. | ........................ | 704/1 |
| 2004/0111271 A1 * | 6/2004 | Tischer | ......................... | 704/277 |
| 2004/0267529 A1 * | 12/2004 | Baker | .......................... | 704/252 |
| 2005/0010412 A1 * | 1/2005 | Aronowitz | ..................... | 704/254 |
| 2005/0075877 A1 * | 4/2005 | Minamino et al. | ............ | 704/254 |
| 2005/0075887 A1 * | 4/2005 | Bernard et al. | ............... | 704/277 |

(Continued)

OTHER PUBLICATIONS

Cardinal, Patrick. "Finite-State Transducers and Speech Recognition." School of Computer Science, McGill University, Montreal, QC. Published Mar. 2003.*

(Continued)

*Primary Examiner* — Pierre-Louis Desir
*Assistant Examiner* — David Kovacek (57) ABSTRACT

A method, apparatus and machine-readable medium are provided. A phonotactic grammar is utilized to perform speech recognition on received speech and to generate a phoneme lattice. A document shortlist is generated based on using the phoneme lattice to query an index. A grammar is generated from the document shortlist. Data for each of at least one input field is identified based on the received speech and the generated grammar.

23 Claims, 5 Drawing Sheets

(56) References Cited

U.S. PATENT DOCUMENTS

| | | | |
|---|---|---|---|
| 2005/0131694 A1* | 6/2005 | Nishitani et al. | 704/256 |
| 2005/0149328 A1* | 7/2005 | Huang et al. | 704/252 |
| 2005/0182629 A1* | 8/2005 | Coorman et al. | 704/266 |
| 2005/0228641 A1* | 10/2005 | Chelba et al. | 704/9 |
| 2006/0015336 A1* | 1/2006 | Parthasarathy | 704/235 |
| 2006/0095262 A1* | 5/2006 | Danieli | 704/251 |
| 2006/0190257 A1* | 8/2006 | Forbes et al. | 704/255 |
| 2006/0287867 A1* | 12/2006 | Cheng et al. | 704/275 |
| 2007/0033003 A1* | 2/2007 | Morris | 704/9 |
| 2007/0038450 A1* | 2/2007 | Josifovski | 704/255 |

OTHER PUBLICATIONS

Fülöp, et al. "Tree Series Transformations that Respect Copying." Theory of Computing Systems. vol. 36, pp. 247-293. Published 2003.*

Tran, Ngoc Mai. "Topics in Tropical Linear Algebra and Applied Probability." University of California, Berkeley. Published 2013.*

* cited by examiner

SYSTEM AND METHOD FOR ROBUST ACCESS AND ENTRY TO LARGE STRUCTURED DATA USING VOICE FORM-FILLING

BACKGROUND OF THE INVENTION

1. Field of the Invention

The present invention relates generally to speech recognition technology and in particular to robust access to large structured data using voice-based form-filling.

2. Introduction

Many web and telephony applications involve retrieval of information from large, structured, databases, using form-filling. A database typically consists of a number of fields. An entry in the database can be retrieved by the user by specifying values for a subset of the fields. In web applications accessed using a desktop computer, entry of fields using a keyboard is simple and accurate. In telephony applications, voice input of fields using automatic speech recognition (ASR) is convenient but error-prone. Every field in a form has to be correctly recognized for a task to be successfully completed. Therefore, recognition accuracy for each field has to be very high.

An acceptable ASR accuracy can be achieved for simple fields such as account numbers, dates, time, etc. However, accurate recognition of names of people or places, airport names, street names, etc., is difficult to achieve if each field is considered individually. There are often strong inter-field constraints which can be exploited to improve ASR accuracy. Simple methods for incorporating these constraints include the construction of a grammar for the complete form, or dynamically constructing grammars for each field constrained by input already provided by the user. These methods can get impractical for forms with many fields and large vocabularies. The above discussion applies not only to information retrieval from databases but also to information input. Consider an application in which the user has to schedule a service visit to an address. The address entry form could be designed to produce only valid addresses as provided by, say, the Postal Service.

There are many user interface issues that also have a significant impact on the success of form-filling. The users could specify either the value of one field, or the values of all the relevant fields, in a single utterance. The first option requires that the user select a field either by voice or multi-modal input. In the second option, the ASR system would have to accept a variety of user responses. Finally, there are memory and CPU constraints that impact the design and performance of form-filling systems.

In view of the above, there is a need for systems and methods for providing voice-based form-filling when conventional approaches are infeasible, such as when a vocabulary and database size are very large.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method of performing speech recognition associated with at least one input field is provided. A phonotactic grammar is utilized to perform speech recognition on received speech and to generate a phoneme lattice. A document shortlist is generated based on using the phoneme lattice to query an index. A grammar is generated from the document shortlist. Data for each of the at least one input field is identified based on the received speech and the generated grammar.

In a second aspect of the invention, a speech processing device is provided. The speech processing device includes at least one processor, a memory, and a bus connecting the at least one processor and the memory. The speech processor is configured to utilize a phonotactic grammar to perform speech recognition on received speech and to generate a phoneme lattice, generate a document shortlist based on using the phoneme lattice to query an index, generate a grammar from the document shortlist, and identify data for each of at least one input field based on the received speech and the generated grammar.

In a third aspect of the invention, a machine-readable medium having recorded thereon instructions for at least one processor is provided. The machine-readable medium includes instructions for utilizing a phonotactic grammar to perform speech recognition on received speech and to generate a phoneme lattice, instructions for generating a document shortlist based on using the phoneme lattice to query an index, instructions for generating a grammar from the document shortlist, and instructions for identifying data for each of at least one input based on the received speech and the generated grammar.

In a fourth aspect of the invention, a speech processing device is provided. The speech processing device includes means for utilizing a phonotactic grammar to perform speech recognition on received speech and to generate a phoneme lattice, means for generating a document shortlist based on using the phoneme lattice to query an index, means for generating a grammar from the document shortlist, and means for identifying data for each of at least one input field based on the received speech and the generated grammar.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary Spoken Dialog System

Figure 1:
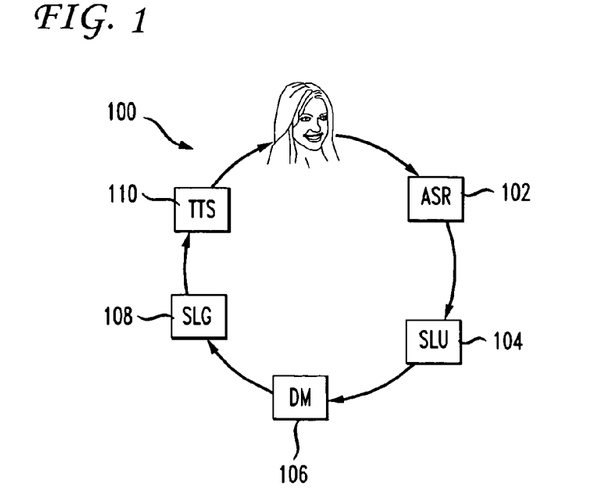
FIG. 1 illustrates an exemplary system which may include implementations consistent with the principles of the invention.

FIG. 1 is a functional block diagram of an exemplary spoken dialog system 100. Spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. DM module 106 may receive the meaning of the speech input as input and may determine an action, such as, for example, providing a spoken response, based on the input. SLG module 108 may generate a transcription of one or more words in response to the action provided by DM 106. TTS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a spoken dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having an audio processing capability, for example a PDA with audio and a WiFi network interface) may have an ASR module wherein a user may say "call mom" and the smartphone may act on the instruction without a "spoken dialog interaction".

Figure 2:
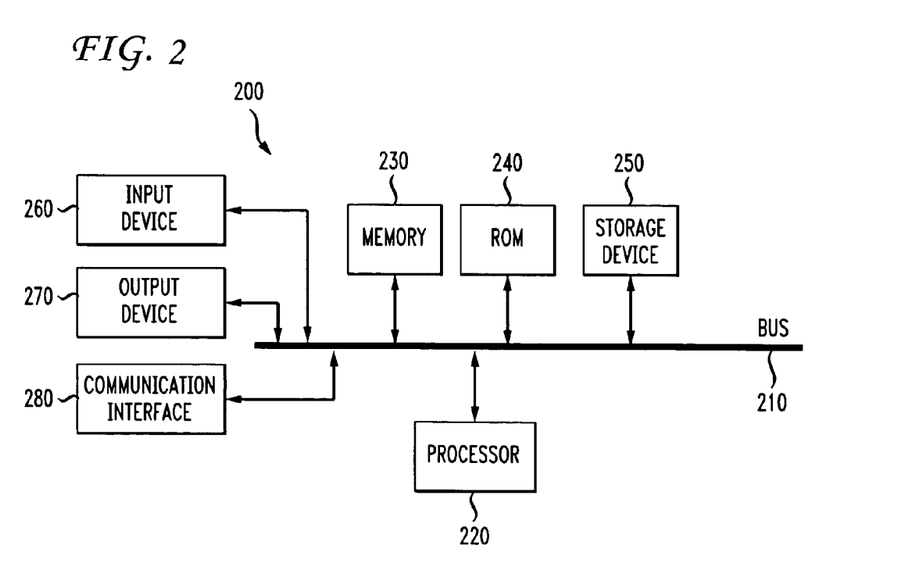
FIG. 2 illustrates an exemplary processing system in which one or more of the modules of FIG. 1 may be implemented.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive. In one implementation consistent with the principles of the invention, storage device 250 may include at least one database.

Input device 260 may include one or more conventional mechanisms that permit a user to input information to system 200, such as a keyboard, a mouse, a pen, a microphone, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Traditional Approaches to Voice-Based Form-Filling

The size of a grammar grows primarily when inter-field constraints are invoked. Two-pass approaches have been shown to be effective in these cases. In the first-pass, an ASR ignores the inter-field constraints and the grammar, $G_I$, is assumed to be a concatenation of the grammar for the i fields given by $G_i$. The ASR may invoke inter-field constraints in the second-pass to produce the final result $$r = \beta[\Pi_O(R_{1-N} \circ G_{1-N})] \quad (1)$$

where, $\circ$ represents composition of transducers, $R_{1-N}$ is a result lattice obtained in the first-pass, $G_{1-N}$ represents the inter-field constraints, and $\Pi_o$ and $\beta$ are projection and best path operations, respectively.

This approach has a number of disadvantages. For example, large intermediate lattices may need to be generated to prevent empty final results, thereby increasing the computational load of the first pass. As the number of fields increase, the probability that the first-pass result does not contain a single path that satisfies the constraints in $G_{1-N}$ increases. Further the order of fields may not be known. Multiple ordering of fields increases the grammar size and the ASR error rate.

Another commonly used approach for recognition of large directories is to recognize easy fields first to use as constraints for subsequent fields that are more difficult to recognize. For instance, the task of recognizing names in a telephone directory can be simplified by asking for the city and state first, and constraining the name grammar with that information. This approach still requires significant dialog design to accommodate users that are unable to provide the requested information, such as the city name in this example. Also, real-time generation of dynamic grammars may be infeasible for large databases.

One approach to limit the complexity of the first-pass recognition, especially with respect to vocabulary size, is to perform phoneme or phone recognition. A task specific phonotactic grammar (statistical N-gram grammars) may be used to output a phone lattice in the first-pass, and both lexical and grammatical constraints could be incorporated by rescoring in a second-pass. A serious problem with this approach is that a phone path that satisfies the task constraints may not be present in the first-pass lattice because of inevitable phone insertions and deletions. One solution is to find the path in the first-pass lattice that best matches a path in the constraint grammar to within a weighted edit distance $$\sum_{r,g} P(r)P(g)d(r, g) \qquad (2)$$

where $P(r)$ and $P(g)$ are the probabilities of the paths r and g in the result and constraint lattices, respectively, and $d(r, g)$ is an edit distance between the paths r and g. This is computationally expensive for large constraint grammars. One approximation is to use N-best phone strings from the first-pass result and select the string that minimizes the edit distance as the final result.

Scalable, Effective, Two-Pass Approach

The traditional approaches presented above are usually effective for tasks with limited complexity (vocabulary size and number of fields) but do not scale well with complexity. A first-pass that includes phone recognition is a convenient way to design a scalable system that is independent of the size of the vocabulary and the database. In implementations consistent with the principles of the invention, a first pass of ASR 102 may generate a phone lattice result to query a database and generate a shortlist of possible database entries. This approach is similar to an approach that may be used to solve a document retrieval problem in which each entry of the database is treated as a document. There are many existing well-known indexing applications in which a speech database may be represented as an indexed phone lattice, which may be queried by text. Once a shortlist is generated, ASR 102 may rescore the shortlist using all available lexical and inter-field constraints to get a final result.

An entry in a database typically may be a sequence of fields. A first step in index generation may include converting each entry into a phone lattice, $L_i$. This lattice may be designed to incorporate transformations that help maximize coverage of user utterances, such as, for example, multiple pronunciations of words, reordering of fields, and multiple ways of speaking entities such as natural numbers. Then, a transducer $T_i$ may be constructed that associates with each factor x (diphone, triphone, tetraphone, etc.) that appears in $L_i$, the item index i. The final index $$I = \text{Det}_{log}(T_1 \cup T_2 \cup \ldots \cup T_I) \qquad (3)$$

where $\text{Det}_{log}$ refers to determinization in a log semiring. For large databases, the index size can grow unmanageably large. In the experiments presented below and in implementations consistent with the principles of the invention, there are several ways in which that growth may be managed. A first way is to restrict the index to factors of interest, such as, for example, triphones and tetraphones. Another way is to split the index into sub-indices.

Figure 3A:
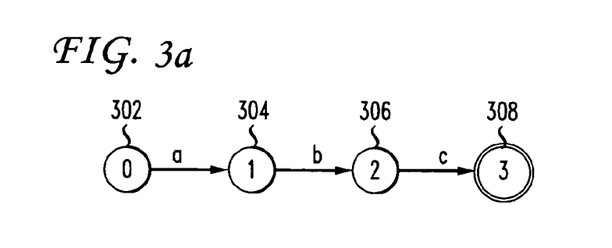
FIGS. 3a-3d illustrate exemplary ways in which an index may be created.
Figure 3B:
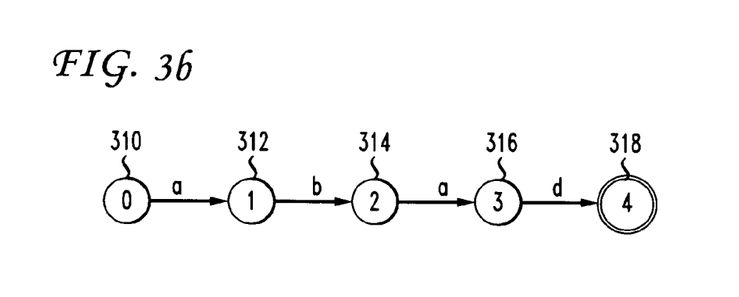

An example of index creation is shown in FIGS. 3a-3d. In this example, the vocabulary consists of four units {a, b, c, d} and the list items in the database are sequences {a b c} and {a b a d} as shown in FIG. 3a and FIG. 3b. FIG. 3a illustrates a sequence of phonemes that make up the item "abc". At 302, phoneme "a" is recognized. At 304, phoneme "b" is recognized. At 306, phoneme "c" is recognized. Reference numeral 308 indicates an end of an item or phoneme sequence.

FIG. 3b illustrates a sequence of phonemes that make up the item "abad". At 310, phoneme "a" is recognized. At 312, phoneme "b" is recognized. At 314, phoneme "a" is recognized again. At 316, phoneme "d" is recognized. Reference numeral 318 indicates an end of an item or phoneme sequence.

Figure 3C:
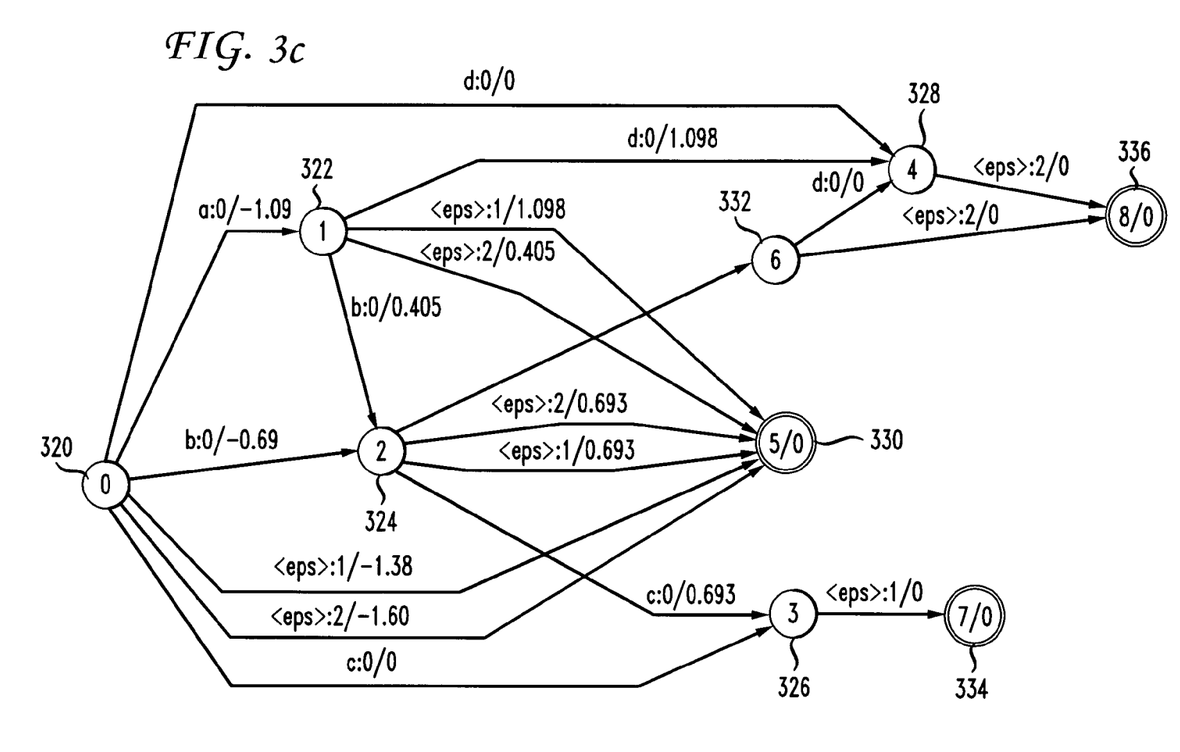
Figure 3D:
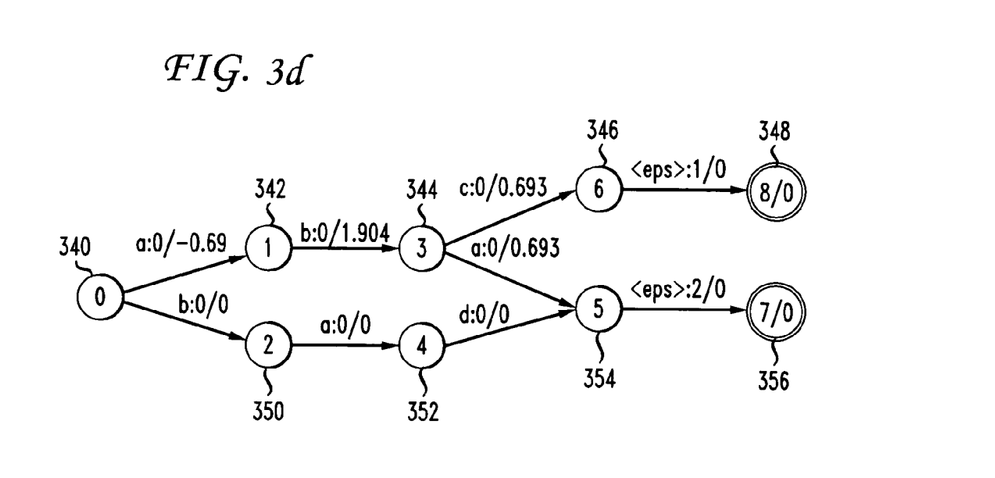

FIG. 3c shows an index generated using all factors. 320, 322, 324, 326 and 334 illustrate the phoneme sequence for "abc". 320, 322, 324, 332, 328 and 336 illustrate the phoneme sequence for "abad".

A more compact index (FIG. 3d) can be generated by restricting the factors to trigrams. 340, 342, 344, 246 and 348 show the phoneme sequence for "abc". 340, 342, 344, 354 and 356 show the phoneme sequence for "aba". 340, 350, 352, 354 and 356 show the phoneme sequence for "bad".

In an implementation consistent with the principles of the invention, ASR 102 may uses a N-gram phonotactic grammar, during the first-pass of recognition, to produce a phone lattice result. The database (corpus) used to train the task-specific phonotactic model may be the same collection of phone lattices, $\{L_1, L_2, \ldots, L_I\}$, used to train the index. The N-gram model may be trained using conventional language modeling tools. It has been found experimentally that an unsmoothed model, one that allows only those phone N-grams that have been seen in the training data, provides a significant increase in the inclusion rate of the correct index entry in the shortlist.

Figure 4:
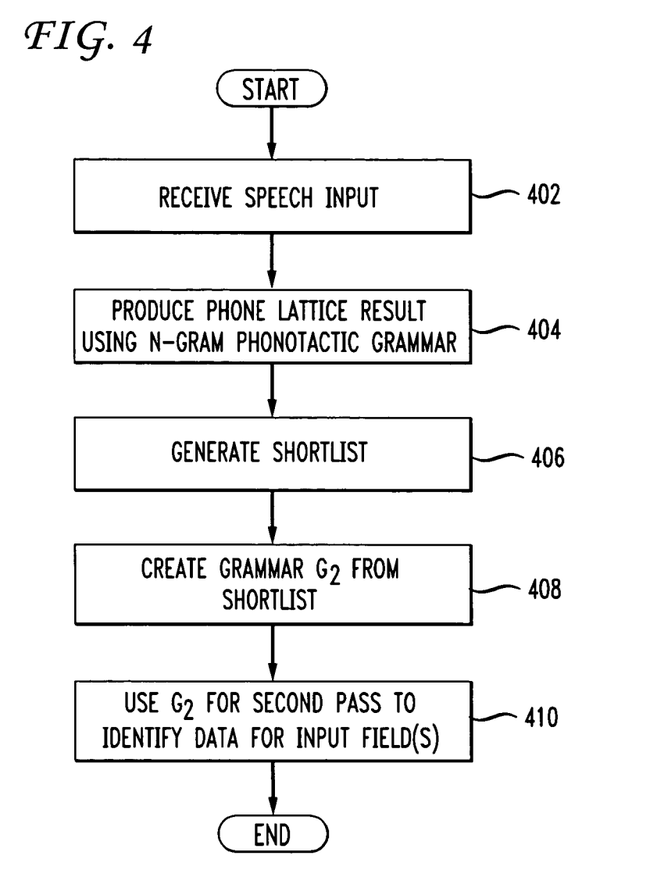
FIG. 4 is a flowchart that illustrates an exemplary method for processing received speech to identify data for one or more input fields.
Figure 5:
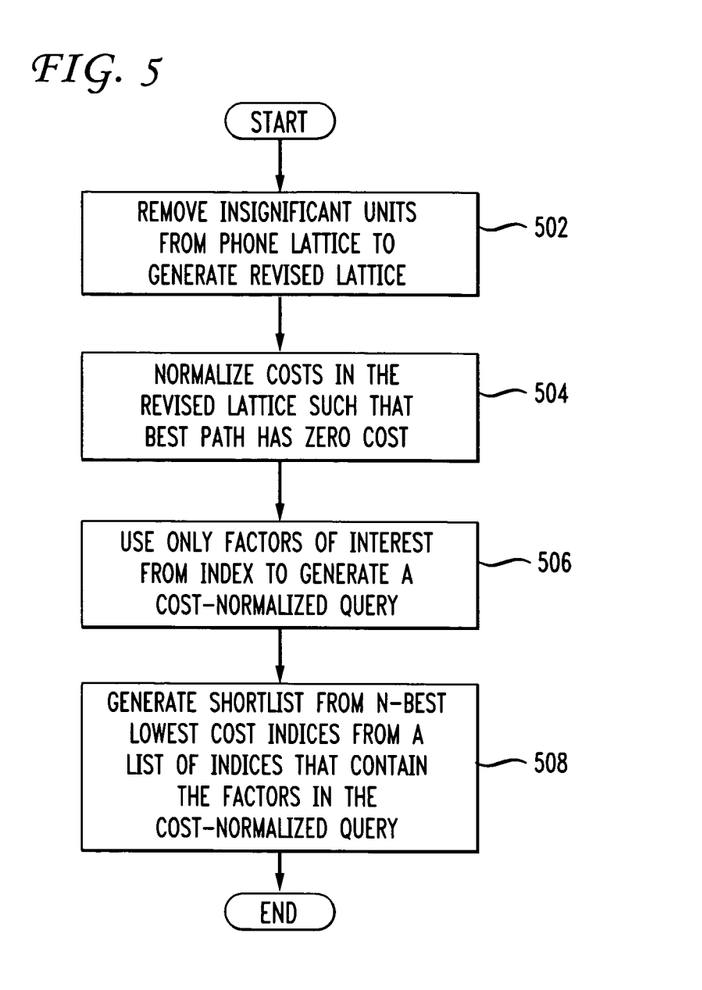
FIG. 5 is a flowchart that illustrates an exemplary method for generating a shortlist based on a given index and a phone lattice.

FIGS. 4 and 5 are flowcharts that illustrate an exemplary process that may be employed in implementations consistent with the principles of the invention to receive speech input, generate a shortlist, and identify data for one or more input fields of a form. The process may begin with ASR 102 receiving speech input (act 402; FIG. 4). ASR 102 may then generate a phone lattice result R using an N-gram phonotactic grammar (act 404). For data entry applications such as, for example, data entry for a service appointment with a cable company, the index may have been previously generated from training phone lattices representing entries in a large name/address database. For example, the index may be generated from the phone-lattices using factors of interest, such as trigrams or any other N-gram that may appear in valid entries of the name/address database. For data access or retrieval, the index may have been previously generated from training phone lattices representing entries in a database and by using factors of interest, such as trigrams or any other N-gram that may appear in valid entries of the database used by the particular data access or retrieval application. ASR 102 may then generate a shortlist (act 406).

FIG. 5 illustrates an exemplary process for creating a shortlist given an index I and a phone lattice R. First, insignificant units, such as silence and filler words may be removed from R to generate or produce revised lattice $R^1$ (act 502; FIG. 5). The revised lattice $R^1$ may then be normalized such that the best path has a cost of 0 (act 504). Next, only factors used in the index I may be retained to produce a cost-normalized query $$Q = \text{Det}_{log}[\Pi_O(R^1 \circ T_F)] \quad (4)$$

where $T_F$ is a transducer that retains only the factors of interest (act 506) Next, a shortlist may be generated by ASR 102 from the N-best lowest cost indices from a list of indices that contain the factors in the cost-normalized query (act 508). The list of indices that contain the factors in Q and the associated cost may be given by $$I^1 = \Pi_O(Q \circ I) \quad (5)$$

The N-best lowest cost indices, computed by $\oplus_{log}$ over all factors, may be given by $$I^S = \beta_{trop}[\text{Det}_{log}(I^1)] \quad (6)$$

For very large databases, I may be represented as a union of sub-indices and the previous acts may be performed in parallel for each sub-index.

Returning to FIG. 4, grammar $G_2$ may be created from the shortlist (act 408; FIG. 4). An index access process is independent (almost) of the order of the fields since it is based on the expected cost of the occurrence of each factor in the query. The dynamic grammar $G_2$ for use in the second-pass recognition or rescoring is constructed such that it covers common variations in the user utterances such as field transpositions. The size of grammar $G_2$ is manageable for reasonable size shortlists, such as, for example, shortlists that have a size less than 1000. Grammar $G_2$ may then be used (a) in second-pass decoding, (b) as a constraint grammar in recognition based on minimizing the edit-distance, or (c) as a grammar for rescoring the first-pass results using gappy phone matches to allow for extraneous speech and phone insertions (act 410).

In the following experiments, the final result is obtained by a second-pass recognition using grammar $G_2$.

EXPERIMENTS

Experiments were performed on data collected from two applications. The first is an application to locate an employee in a corporate database by speaking the name. The size of the database in this application is small enough that a conventional one-pass recognition is feasible. In general, the earlier the constraints are invoked the more efficient the decoding. There is no expectation that the new approach will be more efficient in terms of speed or memory for this application. This application was chosen only to demonstrate that the approach presented in this paper has little overhead even for small databases, even though it was developed to handle very large databases. Of course, an employee locator application can get fairly complicated when one has to resolve multiple listings, etc., and the new approach may be useful in these situations.

The second application involves the recognition of street addresses in a United States Postal Service database. This application was chosen to demonstrate the scalability and effectiveness of the new approach on large databases.

The ASR performance was measured using the sentence (or form) accuracy and not word accuracy. Further, the recognizer was set up to output phone strings rather than word strings. The sentence accuracy was not affected by this decision because the output string was scored as correct if the phone string output by the recognizer was contained in the reference phone lattice for a particular database entry. An advantage of this way of scoring was that homonyms did not need special treatment in the scoring.

Directory Access

The database included 138K entries in which each entry included the first and last name of an employee. The speech corpus was collected during a trial of an employee locator service over the telephone. This was a challenging speech recognition problem because a significant fraction of names were of foreign origin, and also many of the callers spoke English as their second language. The users spoke a first and last name in a single utterance.

The ASR performance for this task is presented in Table 1. The baseline system used a one-pass grammar which was constrained to produce one of 138K full names. The two-pass method used a 4-gram unsmoothed phonotactic model in the first pass to generate phone lattices. A shortlist of 400 entries was generated and rescored to obtain the final result. This baseline represents the best result on this task. The size of the network to represent the phone grammar is shown in the grammar column (G). The ASR was set up to accept a fully composed and optimized network (CLG transducer) for improved efficiency in decoding. The size of CLG, which is a function of the acoustic model, is also given in the table. The results indicate that the new approach does not incur a significant real-time penalty. The benefits of this approach will become obvious for more complex queries such as first name at location, or last at organization.

TABLE 1

(*RT Factor Only Includes First Pass)

| System | Net Size 1-pass (Mb) G | CLG | Sentence Acc (%) | RT Factor |
|---|---|---|---|---|
| FC 1-pass | 2.6 | 7.5 | 84 | 0.23 |
| 2-pass | 2.4 | 6.2 | 83.7 | 0.24* |

The inclusion rate of the correct name in the shortlist of size N is shown in Table 2. An index of 3-grams was used in this experiment. The top choice in the ordered shortlist was the correct name about 67% of the time. The inclusion-rate in the top 800 was over 90%. In this application, there was not much redundancy across fields. The size of the shortlist for a given inclusion rate reduces significantly as the number of fields increase. This is demonstrated in the street address application.

TABLE 2

| Shortlist size (N) | 1 | 10 | 100 | 800 |
|---|---|---|---|---|
| Inclusion rate (%) | 67 | 79 | 87 | 92 |

Street Address Recognition

The database included 35 million US postal service street addresses. The task included speaking street addresses that ranged from somewhat unusual, such as 1¾ 1½ Avenue Prairie Farm Wis. 54762, to common such as 10 Mile Road Clarendon N.C. 28432. The size of the vocabulary was about half a million words and there were approximately 5 million unique street addresses. The speech corpus included users speaking a complete street address in a single utterance over the telephone.

TABLE 3

(*RT Factor Only Includes First Pass)

| System | Net Size 1-pass (Mb) G | CLG | Sentence Acc (%) | RT factor |
|---|---|---|---|---|
| FC 1-pass | 227 | 499 | 90 | 1.5 |
| 2-pass | 9.8 | 20 | 90 | 0.3* |

The parameters of the baseline and 2-pass systems in this experiment were the same as in the directory access task except for the following: (i) the phonotactic model used in the first pass was trained on the address corpus instead of the names corpus, and (ii) the shortlist size was reduced to 80 instead of 400. The results are shown in Table 3. It is obvious that the two-pass approach had a significant advantage in this case. If the order of the fields is not constrained (it was in this example), the advantage of the new approach is likely to be even more significant.

TABLE 4

| Shortlist size (N) | 1 | 10 | 20 | 80 |
|---|---|---|---|---|
| Inclusion rate (%) | 47 | 67 | 77 | 92 |

The inclusion rate as a function of the size of the shortlist is shown in Table 4. The index-access procedure is much more effective in this case due to redundancy across fields.

One caveat in interpreting the real-time performance is that the time taken for the index access as well as the second-pass recognition has not been included. However, the second-pass is very efficient and requires only a small fraction of the time taken for the first pass. Index access depends on the size of the first-pass phone lattice which can be kept small enough to make the index access very efficient. The shortlist size is on an average about one hundred and so the second-pass recognition will not affect the total run-time significantly.

CONCLUSION

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, hardwired logic may be used in implementations instead of processors, or one or more application specific integrated circuits (ASICs) may be used in implementations consistent with the principles of the invention. Further, implementations consistent with the principles of the invention may have more or fewer acts than as described, or may implement acts in a different order than as shown. Accordingly, the appended claims and their legal equivalents should only define the invention, rather than any specific examples given.

We claim:

1. A method comprising:
    performing, via a processor, a first pass of entries in a database to generate a shortlist of the entries, the first pass comprising:
        utilizing a phonotactic grammar to perform speech recognition on received speech and to generate a phoneme lattice, wherein the utilizing ignores inter-field constraints of the phonotactic grammar;
        removing silence and filler words from the phoneme lattice to yield a revised phoneme lattice;
        normalizing costs in the revised phoneme lattice, to yield a normalized phoneme lattice with a best path having a cost of zero;
        identifying N-best lowest cost indices of an index for the database based on the normalized phoneme lattice; and
        generating the shortlist of the entries in the database based on the N-best lowest cost indices;
    performing a second pass on the shortlist of the entries in the database to obtain a final result, the second pass comprising:
        generating a grammar from the shortlist of the entries in the database to yield a generated grammar, having inter-field constraints; and
        identifying data from the database for each of the input field based on the received speech, the generated grammar, and the inter-field constraints; and
    populating an input field of a form using the final result.

2. The method of claim 1, wherein the index is previously generated based on a plurality of training phoneme lattices and factors of interest from valid entries in the database, the factors of interest comprising trigrams, and wherein the database is a name/address database.

3. The method of claim 2, wherein the factors of interest further comprise N-grams based on the valid entries in the database.

4. The method of claim 1, wherein the generated grammar comprises common variations of the input field.

5. The method of claim 1, wherein the index is divided into two sub-indices.

6. The method of claim 1, wherein the phonotactic grammar is an N-gram phonotactic grammar.

7. The method of claim 6, wherein the N-gram phonotactic grammar is unsmoothed, recognizing only N-grams which have been seen in data used to train the N-gram phonotactic grammar.

8. The method of claim 1, wherein the generated grammar is used to: perform one of another speech recognition on the received speech, constrain recognition for each of the input field, and rescore a result of performing the speech recognition.

9. The method of claim 1, wherein generating the shortlist of the entries in the database further comprises:
utilizing only factors of interest from the index to generate a cost-normalized query based on the normalized lattice; and
selecting the N-best lowest indices from indices of the index containing the factors of interest and the cost-normalized query.

10. A system comprising:
a processor; and
a computer-readable storage medium having instructions stored which, when executed by the processor, cause the processor to perform operations comprising:
performing a first pass of entries in a database to generate a shortlist of the entries, the first pass comprising:
utilizing a phonotactic grammar to perform speech recognition on received speech and to generate a phoneme lattice, wherein the utilizing ignores inter-field constraints of the phonotactic grammar;
removing silence and filler words from the phoneme lattice to generate a revised phoneme lattice;
normalizing costs in the revised phoneme lattice, to yield a normalized phoneme lattice with a best path having a cost of zero;
identifying N-best lowest cost indices of an index for the database based on the normalized phoneme lattice; and
generating the shortlist of the entries in the database based on the N-best lowest cost indices;
perform a second pass on the shortlist of the entries in the database to obtain a final result, the second pass comprising:
generating a grammar from the shortlist of the entries in the database to yield a generated grammar, having inter-field constraints; and
identifying data from the database for each of the input field based on the received speech, the generated grammar, and the inter-field constraints; and
populating an input field of a form using the final result.

11. The system of claim 10, wherein the index is previously generated based on a plurality of training phoneme lattices and factors of interest from valid entries in the database, the factors of interest comprising trigrams, and wherein the database is a name/address database.

12. The system of claim 11, wherein the factors of interest comprise N-grams based on the valid entries in the database.

13. The system of claim 10, wherein the generated grammar comprises common variations of the input field.

14. The system of claim 10, wherein the index is divided into two sub-indices.

15. The system of claim 10, wherein the phonotactic grammar is an N-gram phonotactic grammar.

16. The system of claim 10, the computer-readable storage medium having additional instructions stored which result in the operations further comprising performing one of another speech recognition on the received speech, constrain recognition for the input field, and rescore a result of performing the speech recognition.

17. The speech processing device of claim 10, the computer-readable storage medium having additional instructions stored which result in the operations further comprising:
utilizing only factors of interest from the index to generate a cost-normalized query based on the normalized query; and
selecting the N-best lowest indices from indices of the index containing the factors of interest and the cost-normalized query.

18. A computer-readable storage device having instructions stored which, when executed by a computing device, cause the computing device to perform operations comprising:
instructions for performing, via a processor, a first pass of entries in a database to generate a shortlist of the entries, the first pass comprising:
utilizing a phonotactic grammar to perform speech recognition on received speech and to generate a phoneme lattice, wherein the utilizing ignores inter-field constraints of the phonotactic grammar;
removing silence and filler words from the phoneme lattice to yield a revised phoneme lattice;
normalizing costs in the revised phoneme lattice, to yield a normalized phoneme lattice with a best path having a cost of zero;
identifying N-best lowest cost indices of an index for the database based on the normalized phoneme lattice; and
generating the shortlist of the entries in the database based on the N-best lowest cost indices; and
instructions for performing a second pass on the shortlist of the entries in the database to obtain a final result, the second pass comprising:
generating a grammar from the shortlist of the entries in the database to yield a generated grammar, having inter-field constraints; and
identifying data from the database for each of the input field based on the received speech, the generated grammar, and the inter-field constraints; and populating an input field of a form using the final result.

19. The computer-readable storage device of claim 18, wherein the index is previously generated based on a plurality of training phoneme lattices and factors of interest from valid entries in the database, the factors of interest comprising trigrams, and wherein the database is a name/address database.

20. The computer-readable storage device of claim 19, wherein the factors of interest comprise N-grams based on the valid entries in the database.

21. The computer-readable storage device of claim 18, wherein the generated grammar comprises common variations of the input field.

22. The computer-readable storage device of claim 18, wherein the instructions for utilizing a phonotactic grammar to perform speech recognition on the received speech and to generate a phoneme lattice further comprise instructions for generating the phoneme lattice by utilizing an N-gram phonotactic grammar.

23. The computer-readable storage device of claim 18, wherein generating the shortlist of the entries in the database further comprises:
   utilizing only factors of interest from the index to generate a cost-normalized query based on the normalized lattice; and
   selecting the N-best lowest indices from indices of the index containing the factors of interest and the cost-normalized query.

\* \* \* \* \*